(12) United States Patent
Olaru et al.

(10) Patent No.: US 7,517,214 B2
(45) Date of Patent: Apr. 14, 2009

(54) VALVE PIN BUSHING HAVING A THERMALLY INSULATIVE COMPONENT

(75) Inventors: George Olaru, North York (CA); Gino Colonico, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 10 days.

(21) Appl. No.: 11/753,310

(22) Filed: May 24, 2007

(65) Prior Publication Data

US 2008/0292746 A1 Nov. 27, 2008

(51) Int. Cl.
*B29C 45/23* (2006.01)

(52) U.S. Cl. .................. 425/564; 425/566
(58) Field of Classification Search .......... 425/562, 425/563, 564, 565, 566
See application file for complete search history.

(56) References Cited

U.S. PATENT DOCUMENTS

| 5,811,140 A | 9/1998 | Manner |
| 5,935,616 A | 8/1999 | Gellert et al. |
| 6,234,783 B1 | 5/2001 | Shibata et al. |
| 6,379,144 B1 * | 4/2002 | Wright ............... 425/562 |
| 6,712,600 B2 * | 3/2004 | Sattler et al. .......... 425/564 |
| 6,729,871 B2 * | 5/2004 | Sattler et al. .......... 425/564 |
| 6,840,758 B2 | 1/2005 | Babin et al. |
| 7,172,409 B2 | 2/2007 | Tabassi |
| 2003/0143298 A1 | 7/2003 | Blais |
| 2005/0045746 A1 | 3/2005 | Blais |
| 2007/0065537 A1 | 3/2007 | Ciccone |

FOREIGN PATENT DOCUMENTS

JP 7-100863 A 4/1995

* cited by examiner

*Primary Examiner*—Tim Heitbrink
(74) *Attorney, Agent, or Firm*—Medler Ferro PLLC (57) ABSTRACT

A valve pin bushing for a hot runner includes a bushing body having a hole therethrough for receiving a valve pin and a rearward surface for contacting a back plate. A thermally insulative component is coupled to a forward surface of the bushing body. The thermally insulative component is made of a nonmetallic material having a thermal conductivity lower than that of the bushing body.

29 Claims, 7 Drawing Sheets

VALVE PIN BUSHING HAVING A THERMALLY INSULATIVE COMPONENT

BACKGROUND OF THE INVENTION

1. Field of the Invention

The present invention relates generally to an injection molding apparatus and, more particularly, to a valve pin bushing for a hot half of an injection molding apparatus.

2. Related Art

In an injection molding apparatus having a hot half with a hot runner, a movable valve pin can be used to control flow of molding material (e.g., plastic melt) through a nozzle. A portion of the valve pin extends into a melt channel to control the flow of molding material, and a portion of the valve pin extends outside the melt channel for connection to an actuating mechanism.

Typically, a valve pin bushing is installed in a manifold to guide the movement of the valve pin and seal against leakage of molding material out of the melt channel. Sealing generally requires strict tolerances.

Regarding sealing, a hole in the valve pin bushing, through which the pin moves, typically wears over time from the cycling of the valve pin, and eventually, the gap between the valve pin and the hole grows to permit leakage of molding material therethrough. Leakage can be in the form of melt, melt residue, or gasses, any of which can damage the molding apparatus or pollute the environment. Leaking melt and melt residue can also seize the pin in the valve pin bushing, preventing the injection molding apparatus from operating properly. Once the leakage is excessive, the hot half must be disassembled and cleaned, and the valve pin bushing might have to be refurbished or replaced along with any other damaged equipment.

SUMMARY OF THE INVENTION

According to one aspect of the invention, a valve pin bushing for a hot runner includes a bushing body and a thermally insulative component. The bushing body has a rearward surface in contact with a back plate and the thermally insulative component is coupled to a forward surface of the bushing body. The thermally insulative component is made from a nonmetallic material having a lower thermal conductivity than the bushing body material.

According to another aspect of the invention, a hot half for an injection molding apparatus includes a back plate; a sprue having a portion extending through the back plate and having a sprue melt channel; a mold plate coupled to the back plate; an actuator coupled to the back plate; a manifold disposed between the back plate and the mold plate and having a manifold melt channel in communication with the sprue melt channel; a heated nozzle coupled to the manifold and extending through a well in the mold plate and having a nozzle melt channel in communication with the manifold melt channel; a valve pin extending through the nozzle melt channel and coupled to the actuator; and a valve pin bushing located between the back plate and the manifold. The valve pin bushing includes a bushing body having a rearward surface contacting the back plate and a hole through which the valve pin extends. The valve pin bushing also includes a thermally insulative component coupled to a forward surface of the bushing body. The thermally insulative component is made of a nonmetallic material having a thermal conductivity lower than that of the bushing body.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 1:
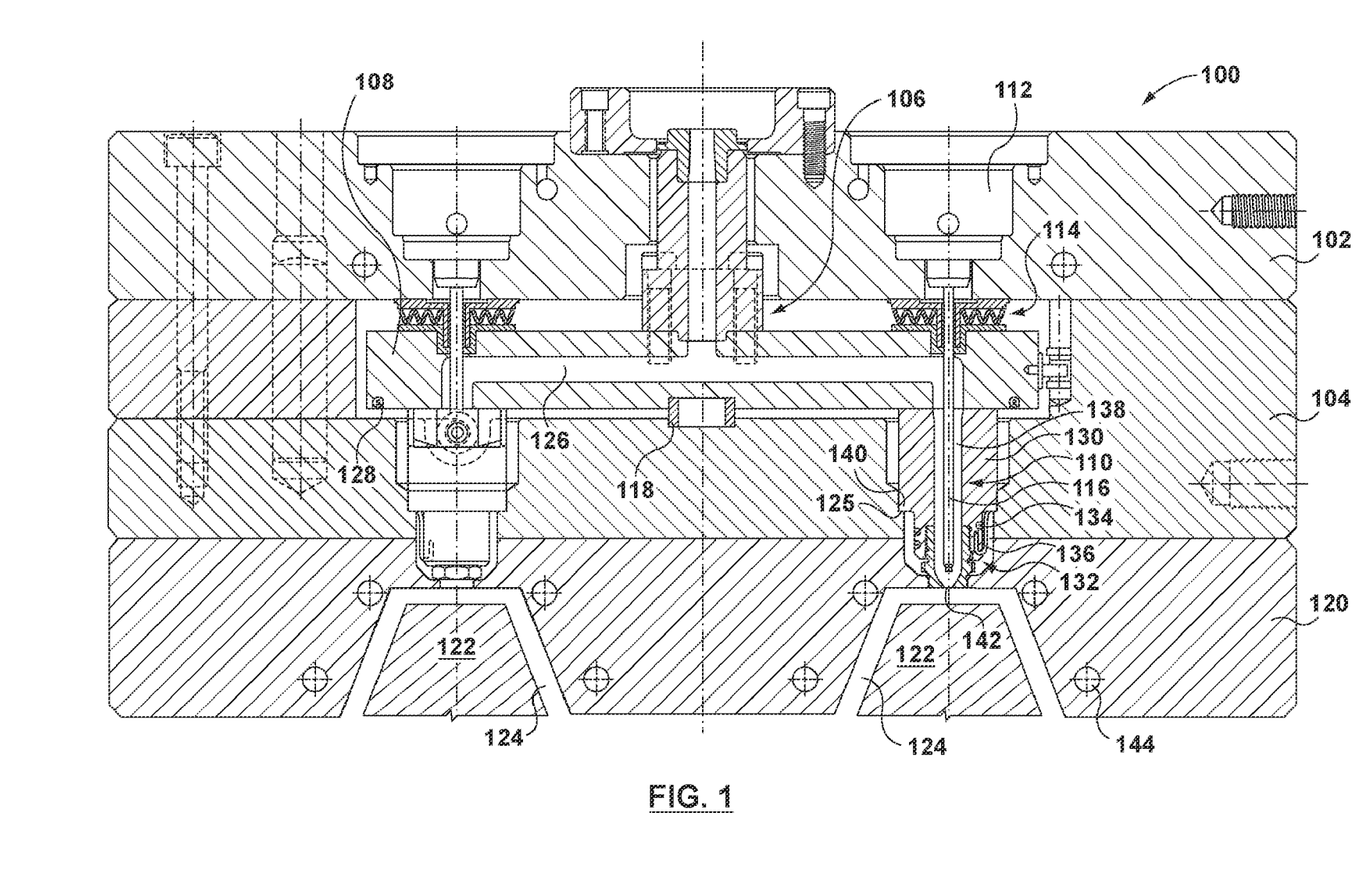
FIG. 1 is a partial sectional view of a hot half for an injection molding apparatus according to an embodiment of the present invention.

FIG. 1 shows a hot half 100 for an injection molding apparatus according to an embodiment of the present invention. In the description of this embodiment, reference numerals in the 100, 200, and 300 series are used to describe parts for ease of understanding. The features and aspects described for the other embodiments can be used accordingly with the present embodiment.

The hot half 100 includes a back plate 102, a mold plate 104, a sprue 106, a manifold 108, nozzles 110, actuators 112, valve pin bushings 114, valve pins 116, and a locating ring 118. The hot half 100 is coupled to a cavity plate 120 in which core parts 122 are situated to define mold cavities 124 where molded products are formed. The term hot half is fairly loosely defined in the art and other parts may also be included when this term is used by those skilled in the art. As such, the hot half 100 can include additional plates and other well-known components, such as bolts, alignment dowels, electrical connectors, mold gate inserts, and so on. The hot half 100 may also include the cavity plate 120, depending on the specific configuration.

The back plate 102 can have cavities in which the actuators 112 are disposed. The back plate 102 can also have cooling channels through which cooling fluid can be circulated, which can help keep the actuators 112 and other temperature sensitive equipment at acceptable operating temperatures. The back plate 102 is but one example of common back plates that can be used in the hot half 100.

The mold plate 104 can be shaped to have an opening or cavity to contain the manifold 108. The mold plate 104 can further have wells for containing the nozzles 110, which can include shoulders 125 for supporting the nozzles 110. The mold plate 104 is but one example of common mold plates that can be used in the hot half 100. Additional mold plates can also be used, depending on the specific configuration.

The sprue 106 includes a sprue bushing, a sprue melt channel, and other well-known components for delivering molding material (e.g., plastic melt) to the manifold 108.

The manifold 108 is disposed between the back plate 102 and the mold plate 104. The manifold 108 has a manifold melt channel 126 in communication with the sprue melt channel for delivering molding material from the sprue 106 to the nozzles 110. The manifold 108 can also have a manifold heater 128, which can be any known type of heater, such as an electrical resistance heater wire.

Each nozzle 110 has a nozzle body 130 and a nozzle tip 132. A nozzle heater 134, such as an electrical resistance heater wire, and a thermocouple 136 can be installed on the nozzle body 130. The nozzle 110 has a nozzle melt channel 138 running therethrough. The nozzles 110 are coupled to the manifold 108 such that the manifold melt channel 126 is in communication with the nozzle melt channels 138. The nozzle body 130 can include a shoulder 140 that contacts the shoulder 125 of the mold plate 104 to support and seal the nozzle 110 against the manifold 108. The nozzle tip 132 has a mold gate 142 that is opened and closed by the valve pin 116. As long as one heater (i.e., heaters 128, 134) is provided, the nozzles 110 in combination with the manifold 108 can be termed the hot runner; however, this term is fairly loosely defined in the art and other parts may also be included when this term is used by those skilled in the art.

Actuators 112 are disposed in the back plate 102 and control the opened and closed positions of the valve pins 116, and, depending on the level of sophistication of the actuators, intermediate positions between opened and closed are also possible. The actuators can be hydraulic, pneumatic, electrical, or any other known kind.

The valve pin bushings 114 are located between the back plate 102 and the manifold 108. The valve pin bushings 114 serve to seal against leakage of molding material from the manifold melt channel 126 and/or the nozzle melt channel 138 to the space between the manifold 108 and the plates 102, 104. The valve pin bushings 114 may also be designed to guide the valve pins 116 to aid in alignment with the mold gates 142. The valve pin bushings 114 will be discussed in more detail later.

The valve pins 116 are well known in the art and can be of any design, such as cylindrical, tapered, or stepped.

The locating ring 118 is situated between the manifold 108 and the mold plate 104 and serves to locate and/or support the manifold 108. The locating ring 118 is an example of a means for supporting the manifold 108 and the heated nozzles 110 between the back plate 102 and the mold plate 104. The above-mentioned sprue 106 and shoulders 140, 125 are another example of such means for supporting. These and other known means for supporting can be used alone or in combination.

The cavity plate 120 can include cooling channels 144 for circulating cooling fluid.

Figure 2:
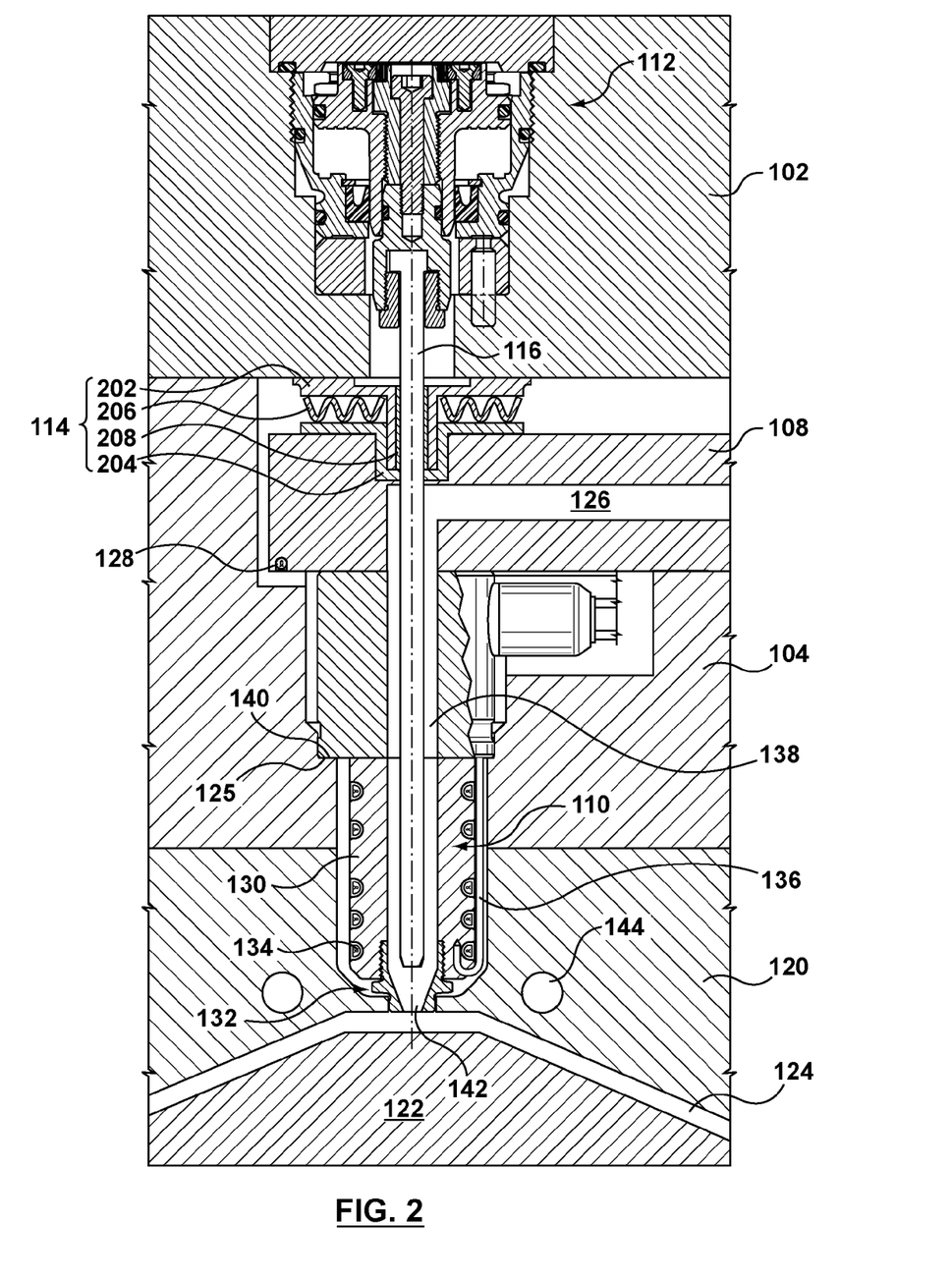
FIG. 2 is a partial sectional view showing the valve pin bushing of FIG. 1.

FIG. 2 shows a larger view of the valve pin bushing 114 among other components of the hot half 100. The valve pin bushing 114 includes a bushing body 202, a thermally insulative component 204, a ridged disc 206, and an insert 208.

The thermally insulative component 204 is made of a non-metallic material, such as ceramic or high-temperature polymer, having a thermal conductivity lower than that of the material of the bushing body 202. The bushing body 202 and insert 208 are each made of a material, such as steel, having a thermal conductivity greater than the material of the thermally insulative component 204. In addition, the insert 208 and bushing body 202 could be made of materials having good hardness to have improved wear resistance, examples of such materials being thermally treated steels, tungsten carbide, and other sintered or powdered metals.

The materials described above allow the valve pin bushing 114 to draw heat away from the interface of the valve pin 116 and the valve pin bushing 114. When this interface is suitably cool, leakage of molding material (e.g., melt, melt residue, or gasses) is reduced or even eliminated. One reason for this is that the thermally conductive bushing body 202 and insert 208 conduct heat from the relatively hot valve pin 116 (heated by the molding material) to the relatively cool back plate 102, while at the same time the thermally insulative component 404 and air trapped between the ridges of the ridged disc 206 impede heat from flowing from the relatively hot manifold 108 to the interface of the valve pin 116 and the valve pin bushing 114. As can be seen in FIG. 2, the bushing body 202 of this embodiment is thermally isolated from the manifold 108, that is, no part of the bushing body 202 directly contacts the manifold 108. When the interface of the valve pin bushing 114 and the valve pin 116 is relatively cool, good sealing is achieved.

Figure 3:
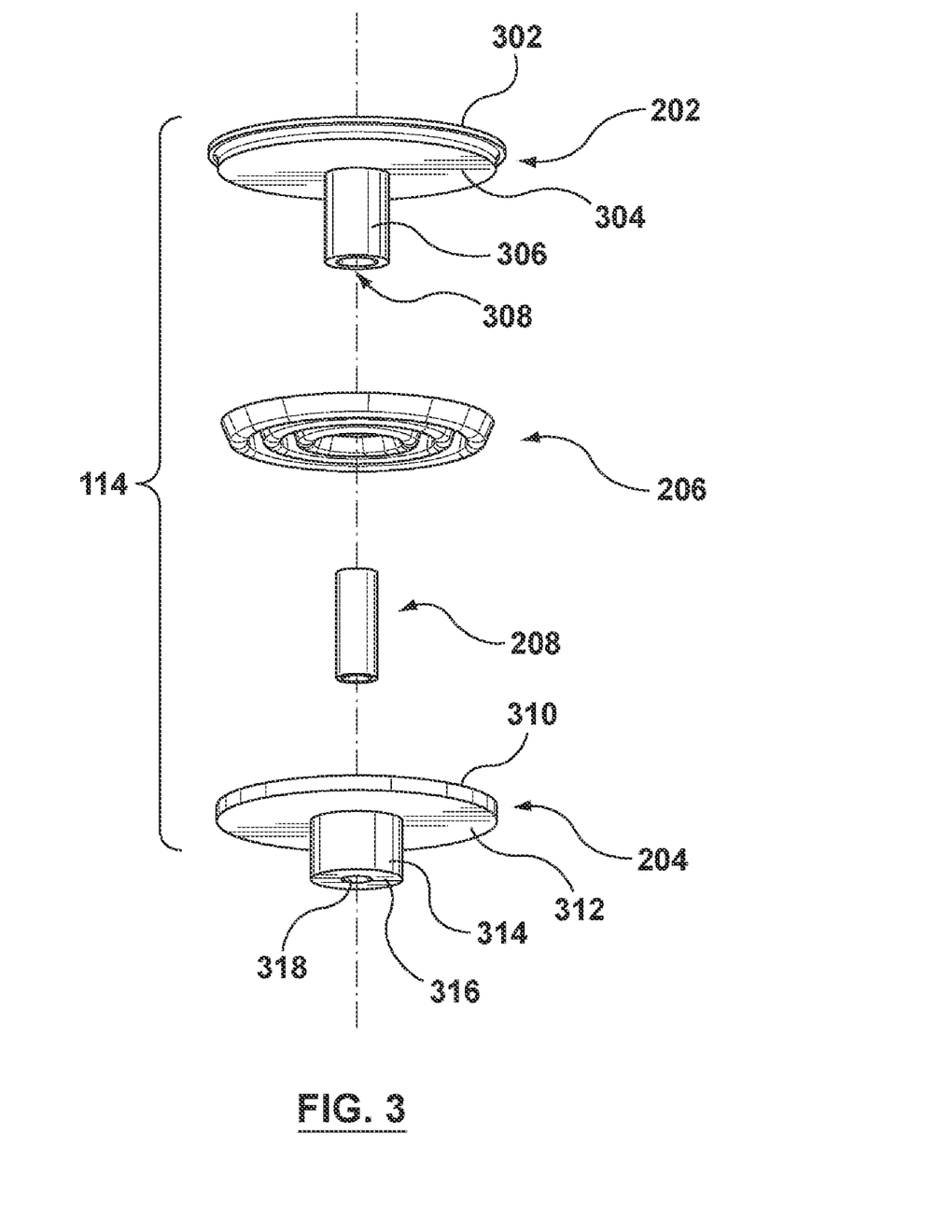
FIG. 3 is an exploded view of the valve pin bushing of FIG. 1.

FIG. 3 shows an exploded view of the valve pin bushing 114. The upper, wider portion of the bushing body 202 has a rearward surface 302 for contacting the back plate 102. The larger the rearward surface 302, the better heat can be transferred out of the bushing body 202 and into the back plate 102. An annular forward surface 304 and a cylindrical lateral surface 306 exist on the other side of the bushing body 202. The forward surface 304 is coupled to the thermally insulative component 204 (via the ridged disc 206 in this embodiment). The lateral surface 306 can contact the thermally insulative component 204 to assist in aligning the thermally insulative component 204 with the bushing body 202. The lateral surface 306 can also include one or more grooves (not shown) for trapping air between the bushing body 202 and the thermally insulative component 204 to increase insulative effect. A hole 308 extends through the bushing body 202 to receive the insert 208 and the valve pin 116. The bushing body 202 can be made using well-known machining processes.

The ridged disc 206 has a spring-like characteristic. In this embodiment, the ridged disc 206 is disposed between the forward surface 304 of the bushing body 202 and the thermally insulative component 204, as shown. The ridged disc 206 serves to compensate for thermal expansion in a direction parallel to the axis of the hole 308. The ridged disc 206 can be made using well-known machining processes.

The insert 208 is inserted into hole 308 in the lower, narrower portion of the bushing body 202 and receives the reciprocating valve pin 116 therethrough. The insert 208 can be fixed inside the bushing body 202 by any known means, such as a mechanical connection (e.g., a shrink fit, friction fit, interference fit, or set screw) or a metallurgical connection (e.g., brazing, welding, or soldering). An internal surface of the insert 208 can have a groove to trap molding material. The insert 208 can be made using well-known machining processes. The insert 208 can be omitted if the bushing body 202 is designed to receive the valve pin 116.

The thermally insulative component 204 has a rearward surface 310 that contacts the ridged disc 206, forward surfaces 312, 316 that contact the manifold 108, and a cylindrical lateral surface 314 that mates with a respective opening in the manifold 108. The lateral surface 314 serves to align the thermally insulative component 204, and thus the entire valve pin bushing 114, with the manifold 108 and ultimately with the mold gate 142. An inner surface 318 of the thermally insulative component 204 can be designed to contact the valve pin 116.

Any or all of the bushing body 202, the ridged disc 206, the insert 208, and the thermally insulative component 204 can be permanently joined to each other or readily separable from each other.

Figure 4:
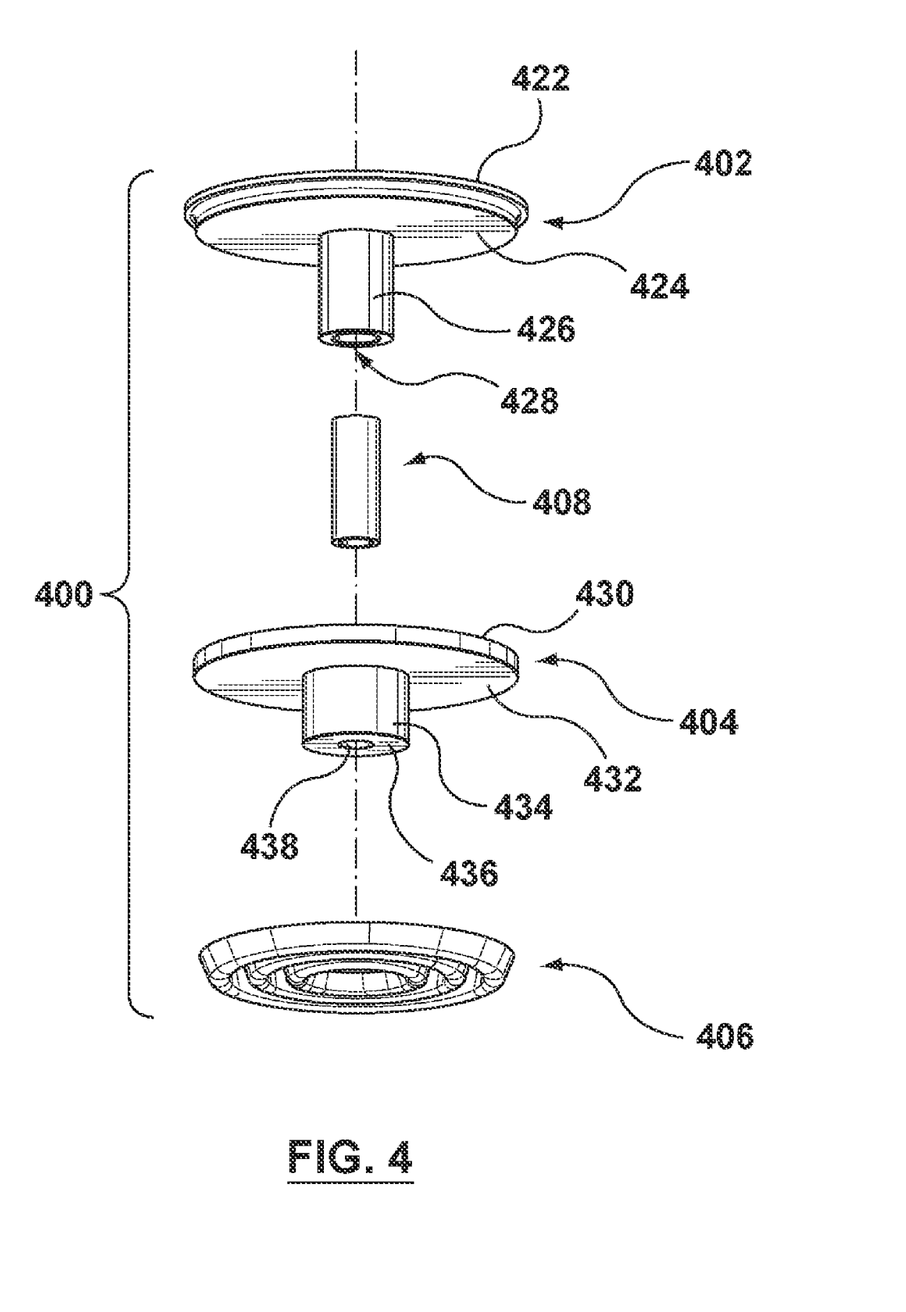
FIG. 4 is an exploded view of a valve pin bushing according to another embodiment of the present invention.

FIG. 4 shows an exploded view of a valve pin bushing 400 according to another embodiment of the present invention. In the description of this embodiment, reference numerals in the 400 series are used to describe parts for ease of understanding. The features and aspects described for the other embodiments can be used accordingly with the present embodiment.

The valve pin bushing 400 includes a bushing body 402, an insert 408, a thermally insulative component 404, and a ridged disc 406. One major difference between this embodiment and the above embodiment of FIGS. 1-3 is the location of the ridged disc 406.

The thermally insulative component 404 is made of a nonmetallic material, such as ceramic or high-temperature polymer, having a thermal conductivity lower than that of the material of the bushing body 402. The bushing body 402 and insert 408 are each made of a material, such as steel, having a thermal conductivity greater than the material of the thermally insulative component 404. The insert 408 may be made of a material having a high hardness for wear resistance, examples of such materials being thermally treated steels, tungsten carbide, and other sintered or powdered metals.

The materials described above allow the valve pin bushing 400 to draw heat away from the interface of a valve pin (e.g., valve pin 116) and the valve pin bushing 400. When this interface is suitably cool, leakage of molding material (e.g., melt, melt residue, or gasses) is reduced or even eliminated. One reason for this is that the thermally conductive bushing body 402 and insert 408 conduct heat from the relatively hot valve pin (heated by the molding material) to a relatively cool back plate (e.g., the back plate 102), while at the same time the thermally insulative component 404 and air trapped between the ridges of the ridged disc 406 impede heat from flowing from a relatively hot manifold (e.g., manifold 108) to the interface of the valve pin and the valve pin bushing 400. As in the embodiment of valve pin bushing 114, the bushing body 402 of valve pin bushing 400 is thermally isolated from the manifold, that is, no part of the bushing body 402 directly contacts the manifold. When the interface of the valve pin bushing 400 and the valve pin is relatively cool, good sealing is achieved.

The upper, wider portion of the bushing body 402 has a rearward surface 422 for contacting the back plate. The larger the rearward surface 422, the better heat can be transferred out of the bushing body 402 and into the back plate. An annular forward surface 424 and a cylindrical lateral surface 426 exist on the other side of the bushing body 402. The forward surface 424 contacts the thermally insulative component 404. The lateral surface 426 can also contact the thermally insulative component 404 to assist in aligning the thermally insulative component 404 with the bushing body 402. The lateral surface 426 can also include one or more grooves (not shown) for trapping air between the bushing body 402 and the thermally insulative component 404 to increase insulative effect. A hole 428 extends through the bushing body 402 to receive the insert 408 and the valve pin. The bushing body 402 can be made using well-known machining processes.

The insert 408 is inserted into hole 428 in the lower, narrower portion of the bushing body 402 and receives the reciprocating valve pin therethrough. The insert 408 can be fixed inside the bushing body 402 by any known means, such as a mechanical connection (e.g., a shrink fit, friction fit, interference fit, or set screw) or a metallurgical connection (e.g., brazing, welding, or soldering). An internal surface of the insert 408 can have a groove to trap molding material. The insert 408 can be made using well-known machining processes. The insert 408 can be omitted if the bushing body 402 is designed to receive the valve pin.

The thermally insulative component 404 has a rearward surface 430 that contacts the forward surface 424 of the bushing body 402, a forward surface 432 that contacts the ridged disc 406, and a cylindrical lateral surface 434 that mates with a respective opening in the manifold. The lateral surface 434 serves to align the thermally insulative component 404, and thus the entire valve pin bushing 400, with the manifold and ultimately with a mold gate (e.g., mold gate 142). An inner surface 438 of the thermally insulative component 404 can be designed to contact the valve pin.

The ridged disc 406 has a spring-like characteristic. In this embodiment, the ridged disc 406 is disposed between the forward surface 432 of the thermally insulative component 404 and the manifold. The ridged disc 406 serves to compensate for thermal expansion in a direction parallel to the axis of the hole 428. The ridged disc 406 can be made using well-known machining processes.

Any or all of the bushing body 402, the insert 408, the thermally insulative component 404, and the ridged disc 406 can be permanently joined to each other or readily separable from each other. For example, the thermally insulative component 404 can be a sprayed-on coating applied to the annular forward surface 424 and the cylindrical lateral surface 426 of the bushing body 402.

Figure 5:
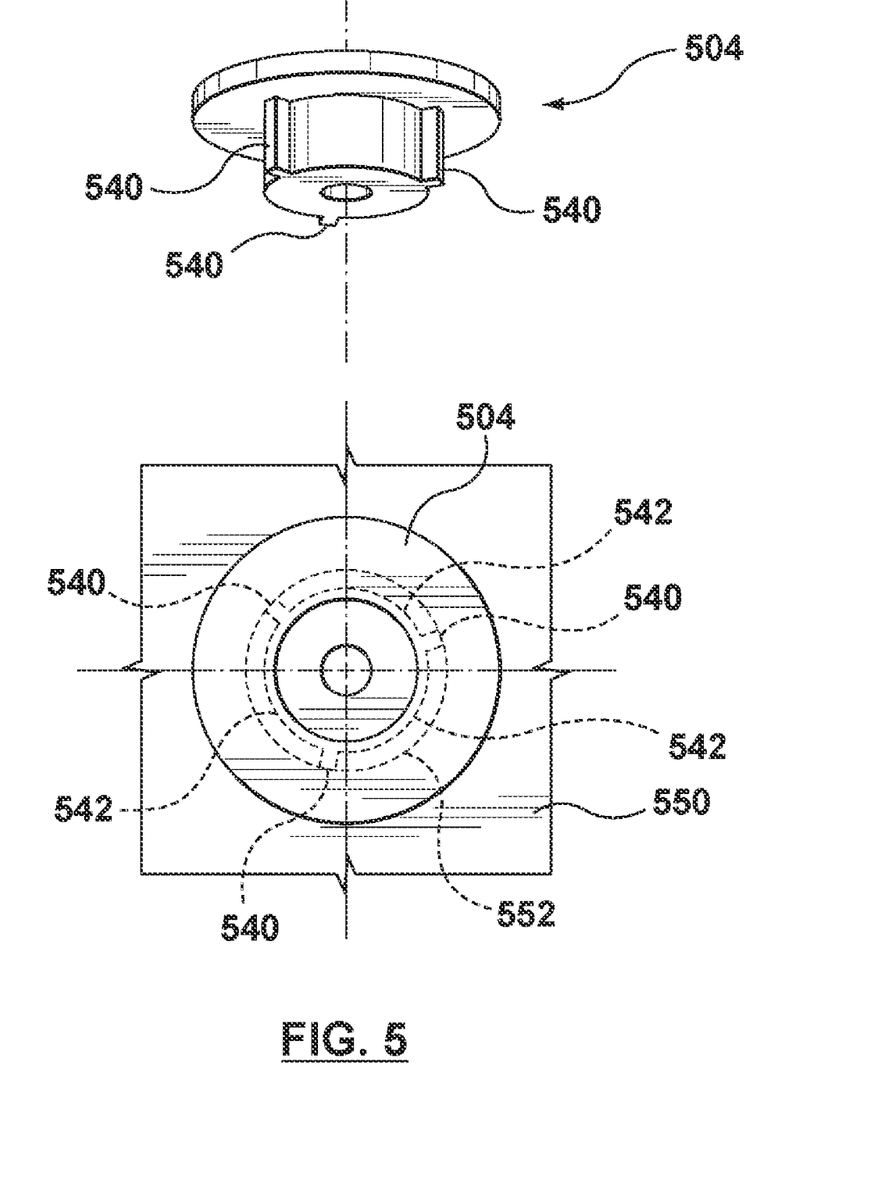
FIG. 5 is a combination perspective and top view of another thermally insulative component that can be used in the valve pin bushings of FIGS. 1-4.

FIG. 5 illustrates another thermally insulative component 504 that can be used in the valve pin bushings of FIGS. 1-4. In the description of this embodiment, reference numerals in the 500 series are used to describe parts for ease of understanding. The features and aspects described for the other embodiments can be used accordingly with the present embodiment.

The thermally insulative component 504 is similar to the thermally insulative components 204 and 404. One major difference is that the thermally insulative component 504 includes three radially extending ribs 540, though more or fewer ribs could be used. The ribs 540 align the thermally insulative component 504, and thus the entire valve pin bushing, in a respective opening 552 of a manifold 550 (shown in the top view, in which other parts are omitted for clarity). The ribs 540 offer the advantage of defining air gaps 542 that further impede the flow of heat from the manifold 550 into the valve pin bushing, and thus further improve sealing at the interface of the valve pin bushing and the valve. As such, fewer or smaller ribs are generally better than more or larger ribs. The thermally insulative component 504 is made of a nonmetallic material having relatively low thermal conductivity, such as ceramic or high-temperature polymer.

Figure 6:
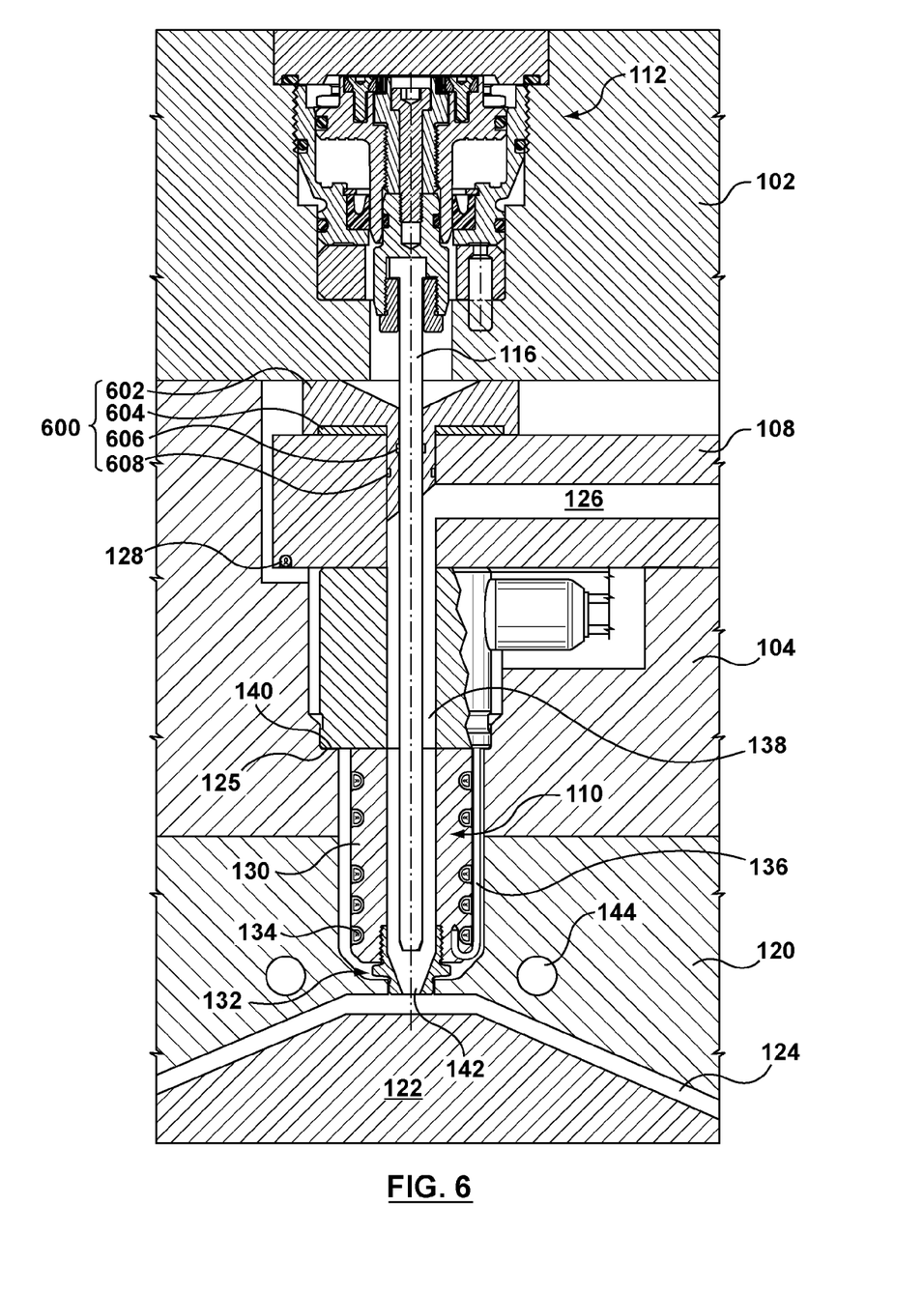
FIG. 6 is a partial sectional view of another embodiment of a valve pin bushing according to the present invention.

FIG. 6 shows another embodiment of a valve pin bushing according to the present invention. In the description of this embodiment, reference numerals in the 600 and 700 series are used to describe parts for ease of understanding. The features and aspects described for the other embodiments can be used accordingly with the present embodiment.

The valve pin bushing 600 in FIG. 6 is shown among other components of a hot half (see description for FIG. 1). The valve pin bushing 600 includes a bushing body 602 and a thermally insulative component 604. An internal surface of the bushing body 602 has a groove 606 for trapping molding material; and a cylindrical lateral surface (ref. 706 of FIG. 7) of the bushing body 602 has a groove 608 for trapping air. The grooves 606, 608 are optional.

The thermally insulative component 604 is made of a nonmetallic material, such as ceramic or high-temperature polymer, having a thermal conductivity lower than that of the material of the bushing body 602. The bushing body 602 may be made of a material, such as steel, having a thermal conductivity greater than the material of the thermally insulative component 604. For wear resistance, the material of the bushing body 602 can further be selected to have a high hardness, examples of such materials being thermally treated steels, tungsten carbide, and other sintered or powdered metals.

The materials described above allow the valve pin bushing 600 to draw heat away from the interface of the valve pin 116 and the bushing body 602. When this interface is suitably cool, leakage of molding material (e.g., melt, melt residue, or gasses) is reduced or even eliminated. One reason for this is that the thermally conductive bushing body 602 conducts heat from the relatively hot valve pin 116 (heated by the molding material) to the relatively cool back plate 102, while at the same time the thermally insulative component 604 and the grooves 606, 608 impede heat from flowing from the relatively hot manifold 108 to the interface of the valve pin 116 and the bushing body 602. When the interface of the bushing body 602 and the valve pin 116 is relatively cool, good sealing is achieved. The groove 606 further enhances sealing.

Figure 7:
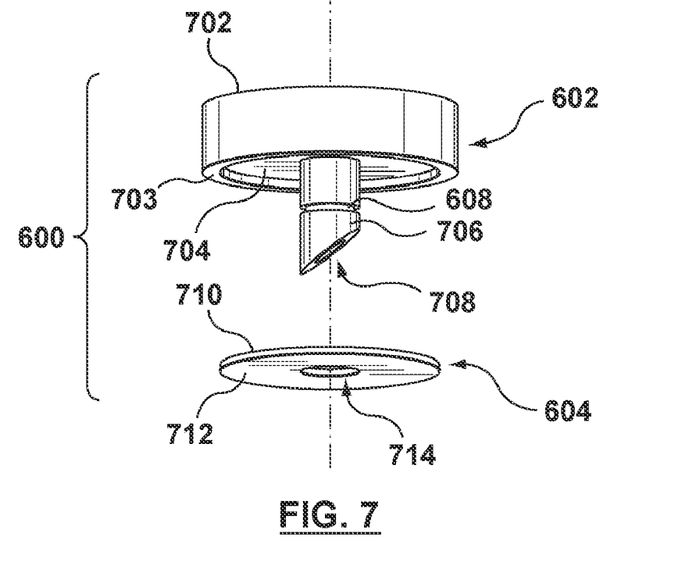
FIG. 7 shows an exploded view of the valve pin bushing of FIG. 6.

FIG. 7 shows an exploded view of the valve pin bushing 600. The upper, wider portion of the bushing body 602 has a rearward surface 702 for contacting the back plate 102. The larger the rearward surface 702, the better heat can be transferred out of the bushing body 602 and into the back plate 102. A shoulder 703, a recessed annular forward surface 704, and a cylindrical lateral surface 706 exist on the other side of the bushing body 602. The forward surface 704 is coupled to the thermally insulative component 604. The lateral surface 706 serves to align the bushing body 602, and thus the entire valve pin bushing 600, with the manifold 108 and ultimately with the mold gate 142. As shown, the lateral surface 706 has the groove 608 for trapping air to increase insulative effect. A hole 708 extends through the bushing body 602 to receive the valve pin 116. The internal surface defining the hole 708 includes the groove 606 (shown in FIG. 6) for trapping molding material to improve sealing and/or insulative effect. The bushing body 602 can be made using well-known machining processes.

The thermally insulative component 604 is disc-like in shape and has an opening 714 for mating with the lateral surface 706 of the bushing body 602. The inside surface of the opening 714 need not contact the lateral surface 706. The thermally insulative component 604 has a rearward surface 710 that can contact the forward surface 704 of the bushing body 602 and a forward surface 712 that can contact the manifold 108. The shoulder 703 of the bushing body 602 should contact the manifold 108 and/or the thermally insulative component 604 should be made thick enough (so that rearward surface 710 contacts forward surface 704 and forward surface 712 contacts manifold 108) to sustain any compressive loading on the valve pin bushing 600.

The bushing body 602 and the thermally insulative component 604 can be permanently joined to each other or readily separable from each other. For example, the thermally insulative component 604 can be a sprayed-on coating applied to the forward surface 704 of the bushing body 602.

Figure 8:
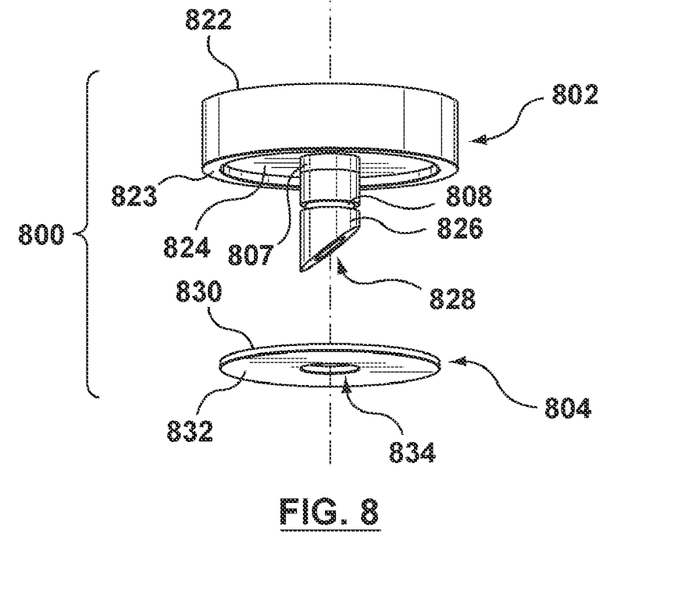
FIG. 8 shows an exploded view of a valve pin bushing according to another embodiment of the present invention.

FIG. 8 shows another embodiment of a valve pin bushing according to the present invention. In the description of this embodiment, reference numerals in the 800 series are used to describe parts for ease of understanding. The features and aspects described for the other embodiments can be used accordingly with the present embodiment. The valve pin bushing 800 is similar to the valve pin bushing 600. One major difference is that the valve pin bushing 800 includes an additional insulative portion.

The valve pin bushing 800 includes a bushing body 802 and a thermally insulative component 804. An internal surface of the bushing body 802 has a groove (not shown) for trapping molding material; and a cylindrical lateral surface 826 of the bushing body 802 has a groove 808 for trapping air. Both of these grooves are optional. An additional thermally insulative portion 807 is provided in the lateral surface 826 and can be a groove (similar or identical to the groove 808) partially filled with a nonmetallic material, fully filled with a nonmetallic material (e.g., to come flush with the lateral surface 826), or left empty for insulating air to occupy.

The thermally insulative component 804 and the additional thermally insulative portion 807 are each made of a nonmetallic material, such as ceramic or high-temperature polymer, having a thermal conductivity lower than that of the material of the bushing body 802.

The bushing body 802 is made of a material, such as steel, having a thermal conductivity greater than the materials of the thermally insulative component 804 and the additional thermally insulative portion 807. For wear resistance, the material of the bushing body 802 can further be selected to have a high hardness, examples of such materials being thermally treated steels, tungsten carbide, and other sintered or powdered metals.

The materials described above allow the valve pin bushing 800 to draw heat away from the interface of a valve pin (e.g., valve pin 116) and the bushing body 802. When this interface is suitably cool, leakage of molding material (e.g., melt, melt residue, or gasses) is reduced or even eliminated. One reason for this is that the thermally conductive bushing body 802 conducts heat from the relatively hot valve pin (heated by the molding material) to a relatively cool back plate (e.g., back plate 102), while at the same time the thermally insulative component 804, the additional thermally insulative portion 807, and the grooves impede heat from flowing from a relatively hot manifold (e.g., manifold 108) to the interface of the valve pin and the bushing body 802. The location of the additional thermally insulative portion 807 means that it has a strong influence on the temperature of the interface of the valve pin and the bushing body 802, and thus, the amount and type of insulative material as well as the size of the groove that this material occupies can be selected to optimize the temperature of the interface. When the interface of the bushing body 802 and the valve pin is relatively cool, good sealing is achieved. The groove on the internal surface of the bushing body 802, if provided, further enhances sealing.

The upper, wider portion of the bushing body 802 has a rearward surface 822 for contacting the back plate. The larger the rearward surface 822, the better heat can be transferred out of the bushing body 802 and into the back plate. A shoulder 823, a recessed annular forward surface 824 and the lateral surface 826 exist on the other side of the bushing body 802. The forward surface 824 is coupled to the thermally insulative component 804. The lateral surface 826 serves to align the bushing body 802, and thus the entire valve pin bushing 800, with the manifold and ultimately with a mold gate (e.g., mold gate 142). As shown, the lateral surface 826 has the optional groove 808 for trapping air to increase insulative effect. The additional thermally insulative portion 807, as described above, is provided in the lateral surface 826. A hole 828 extends through the bushing body 802 to receive the valve pin. The internal surface defining the hole 828 can include a groove (as shown in the embodiment of FIG. 6) for trapping molding material to improve sealing and/or insulative effect. The bushing body 802 can be made using well-known machining processes.

The thermally insulative component 804 is disc-like in shape and has an opening 834 for mating with the additional thermally insulative portion 807. The inside surface of the opening 834 need not contact the additional thermally insulative portion 807. The thermally insulative component 804 has a rearward surface 830 that can contact the forward surface 824 of the bushing body 802 and a forward surface 832 that can contact the manifold. The shoulder 823 of the bushing body 802 should contact the manifold and/or the thermally insulative component 804 should be made thick enough (so that rearward surface 830 contacts forward surface 824 and forward surface 832 contacts the manifold) to sustain any compressive loading on the valve pin bushing 800.

Any or all of the bushing body 802, the thermally insulative component 804, and the additional thermally insulative portion 807 can be permanently joined to each other or readily separable from each other. For example, the thermally insulative component 804 and the additional thermally insulative portion 807 can be a sprayed-on coating applied to the bushing body 802.

For all embodiments, the overall cylindrical shape of the valve pin bushing and the cylindrical external and internal surfaces described can be of other geometry. Cylindrical shapes are common because they are relatively simple to manufacture. In addition, the sizes and shapes of the components of the valve pin bushing can be varied to influence the temperature at the interface of the valve pin and the valve pin bushing. For example, material can be added to or removed from the upper, wider portion of the bushing body 602 to decrease or increase, respectively, the temperature of the interface.

Nonmetallic materials are materials that do not have the common properties and characteristics of metals and/or are not typically used as metals in the injection molding industry. It should be recognized, however, that many nonmetallic materials (e.g., alumina), comprise metal elements (e.g., aluminum).

Ceramics include, but are not limited to, alumina, zirconia, silicon carbide, silicon nitride, aluminum nitride, titanium carbide, titanium nitride, polycrystalline diamond, polycrystalline cubic boron nitride, boron carbide, and composite materials having ceramics (e.g., cermets). Suitable types of ceramics are commercially available from Dynamic-Ceramic Ltd., Crewe, UK; Industrial Jewels, Pvt, Ltd., India; Micro Tools Ltd., Israel; Kyocera Corporation, Japan; and Ssangyong Conglomerate, South Korea. Ceramic components can be made using well-known processes, such as casting and molding.

High-temperature polymers include, but are not limited to, PEEK and polyimides, such as VESPEL by DuPont of Delaware.

Coatings of nonmetallic materials can be formed via spraying, chemical vapor deposition, or other known methods.

In this disclosure, the term "coupled" means connected to, but not necessarily contacting, and an intermediate piece could be used.

Although preferred embodiments of the present invention have been described, those of skill in the art will appreciate that variations and modifications may be made without departing from the spirit and scope thereof as defined by the appended claims. All patents and publications discussed herein are incorporated in their entirety by reference thereto.

What is claimed is:

1. A valve pin bushing for a hot runner, comprising:
a bushing body having a hole therethrough for receiving a valve pin and a rearward surface contacting a back plate, the bushing body comprising a first material having a first thermal conductivity; and
a thermally insulative component coupled to a forward surface of the bushing body, the thermally insulative component comprising a second, nonmetallic material having a second thermal conductivity lower than the first thermal conductivity.

2. The valve pin bushing of claim 1 further comprising a ridged disc disposed between the forward surface of the bushing body and a rearward surface of the thermally insulative component.

3. The valve pin bushing of claim 1 further comprising an insert disposed in the hole, wherein the valve pin extends through the insert.

4. The valve pin bushing of claim 3, wherein the insert is made of a material that is harder than the first material.

5. The valve pin bushing of claim 1, wherein a rearward surface of the thermally insulative component contacts the forward surface of the bushing body.

6. The valve pin bushing of claim 5 further comprising a ridged disc coupled to a forward surface of the thermally insulative component.

7. The valve pin bushing of claim 1, wherein the thermally insulative component has radially extending ribs for contacting a manifold.

8. The valve pin bushing of claim 1 further comprising an additional thermally insulative portion coupled to a lateral surface of the bushing body.

9. The valve pin bushing of claim 8, wherein the additional thermally insulative portion comprises a groove in the lateral surface of the bushing body.

10. The valve pin bushing of claim 9, wherein the groove is partially or fully filled with nonmetallic material.

11. The valve pin bushing of claim 1, wherein the second, nonmetallic material is a ceramic.

12. The valve pin bushing of claim 1, wherein the second, nonmetallic material is a ceramic coating.

13. The valve pin bushing of claim 1, wherein the second, nonmetallic material is a high-temperature polymer.

14. The valve pin bushing of claim 1, wherein the second, nonmetallic material is a high-temperature polymer coating.

15. The valve pin bushing of claim 1, wherein the bushing body has a groove in an internal surface defining the hole.

16. The valve pin bushing of claim 1, wherein the bushing body has a groove in a lateral surface for trapping air.

17. The valve pin bushing of claim 1, wherein the bushing body is thermally isolated from a manifold such that no part of the bushing body contacts the manifold.

18. A hot half for an injection molding apparatus, comprising:
a back plate;
a sprue having a portion extending through the back plate and having a sprue melt channel;
a mold plate coupled to the back plate;
an actuator coupled to the back plate;
a manifold disposed between the back plate and the mold plate and having a manifold melt channel in communication with the sprue melt channel;
a heated nozzle coupled to the manifold and extending through a well in the mold plate, the heated nozzle having a nozzle melt channel in communication with the manifold melt channel;
a valve pin extending through the nozzle melt channel and coupled to the actuator; and
a valve pin bushing disposed between the back plate and the manifold, the valve pin bushing including:

a bushing body having a rearward surface contacting the back plate and a hole through which the valve pin extends, wherein the bushing body comprises a first material having a first thermal conductivity; and a thermally insulative component coupled to a forward surface of the bushing body, the thermally insulative component comprising a second, nonmetallic material having a second thermal conductivity lower than the first thermal conductivity.

19. The hot half of claim 18 further comprising a ridged disc disposed between the forward surface of the bushing body and a rearward surface of the thermally insulative component.

20. The hot half of claim 18 further comprising an insert disposed in the hole, wherein the valve pin extends through the insert and the insert is made of a material that is harder than the first material.

21. The hot half of claim 18, wherein a rearward surface of the thermally insulative component contacts the forward surface of the bushing body.

22. The hot half of claim 21 further comprising a ridged disc coupled to a forward surface of the thermally insulative component.

23. The hot half of claim 18, wherein the thermally insulative component has radially extending ribs for contacting the manifold.

24. The hot half of claim 18 further comprising a groove in a lateral surface of the bushing body, the groove being partially or fully filled with nonmetallic material.

25. The hot half of claim 18, wherein the second, nonmetallic material is selected from a group consisting of ceramic, ceramic coating, high-temperature polymer, and high-temperature polymer coating.

26. The hot half of claim 18, wherein the thermally insulative component contacts the manifold.

27. The hot half of claim 18, wherein the thermally insulative component contacts the valve pin.

28. The hot half of claim 18, wherein the thermally insulative component is disposed between the bushing body and the manifold such that no part of the bushing body directly contacts the manifold.

29. A hot half for an injection molding apparatus, comprising:

a back plate;

a mold plate coupled to the back plate;

an actuator coupled to the back plate;

a manifold disposed between the back plate and the mold plate and having a manifold melt channel;

a heated nozzle coupled to the manifold and extending through a well in the mold plate, the heated nozzle having a nozzle melt channel in communication with the manifold melt channel;

a valve pin extending through the nozzle melt channel and coupled to the actuator; and a valve pin bushing disposed between the back plate and the manifold, the valve pin bushing including:

a bushing body having a rearward surface contacting the back plate and a hole through which the valve pin extends, wherein the bushing body comprises a first material having a first thermal conductivity; and a thermally insulative component coupled to a forward surface of the bushing body such that the bushing body does not contact the manifold, the thermally insulative component comprising a second, nonmetallic material having a second thermal conductivity lower than the first thermal conductivity.

* * * * *